United States Patent Office 2,820,801
Patented Jan. 21, 1958

2,820,801
PREPARATION OF AMIDES

Peter L. De Benneville and Charles L. Levesque, Philadelphia, Pa., assignors to Rohm & Haas Company, Philadelphia, Pa., a corporation of Delaware No Drawing. Application August 2, 1954
Serial No. 447,391

7 Claims. (Cl. 260—404)

This invention deals with a method for preparing carboxylic amides. According to this method nitriles are reacted with water and primary amines in the presence of limited amounts of hydrogen sulfide as catalyst.

It has previously been proposed to react a nitrile, hydrogen sulfide, and an amine to form a thioamide and ammonia. The attempted reaction of nitriles, amines, and water, on the other hand, fails to give any noticeable conversion to carboxylic amides in most cases. For example, butyronitrile and aqueous piperidine have been heated together under reflux for prolonged periods of time without any determinable reaction. Similarly, phenylacetonitrile and benzylamine were heated in an aqueous system without amide formation. Attempts were also made to react benzonitrile, water, and benzylamine, to react adiponitrile, water and methylamine under pressure, and to react other combinations of typical nitriles and typical amines in the presence of water without detection of any amide as product. One of us has found an exception to the general rule, as described in a copending application, where by selection of both amine and nitrile it is possible to prepare amides.

We have now found that nitriles and primary amines, in which the carbon attached to nitrogen carries a hydrogen atom, can be reacted in aqueous systems to form carboxylic amides provided 1 to 50 mole percent preferably 3 to 10 mole percent of hydrogen sulfide is present as catalyst, based on the nitrile. The products obtained contain no more than a trace of sulfur. The reacting temperatures are between about 85° to about 175° C. and the reaction is performed under pressure. The temperature used depends upon the particular reactants selected.

Nitriles which may be used include those of the fatty acid series, the aromatic series, and others. There may be used mono-nitriles or polynitriles. Typical nitriles are acetonitrile, propionitrile, butyronitrile, isobutyrontrile, isovaleronitrile, valeronitrile, $\alpha$ - methylbutyronitrile, $\alpha$-ethylbutyronitrile, capronitrile, caprylonitrile, caprinitrile, lauronitrile, myristonitrile, palmitonitrile, stearonitrile, oleonitrile, benzonitrile, p-methoxybenzonitrile, p-chlorobenzonitrile, tolunitriles, hydratroponitrile, hexahydrobenzonitrile, and malononitrile, succinonitrile, methylsuccinonitrile, adiponitrile, pimelonitrile, sebaconitrile, terephthalonitrile, phthalonitrile, camphorontrile, dicyanoethyl ether, dicyanoethyl sulfide, $\beta$-hydroxypropionitrile, $\gamma$ - hydroxybutyronitrile, $\beta$ - hydroxybutyronitrile, $\beta$ - hydroxyisobutyronitrile, methoxyacetonitrile, methoxymethoxyacetonitrile, 1-methoxyethoxyacetonitrile, $\alpha$-(methoxymethoxy)propionitrile, ethoxyacetonitrile, butyoxyacetonitrile, $\beta$ - methoxypropionitrile, $\beta$ - butoxypropionitrile, $\beta$-octoxypropionitrile, $\beta$-methoxyisobutyronitrile, $\beta$-octoxyisobutyronitrile, phenoxypropionitrile, dimethylaminopropionitrile, dibutylaminopropionitrile, morpholinopropionitrile, pyrrolidinopropionitrile, piperidinopropionitrile, etc.

The preferred nitriles may conveniently be summarized by the general formula $R^o(CN)_x$, where $x$ is an integer usually one or two, and $R^o$ represents an alkyl, cycloalkyl, hydroxyalkyl, alkoxyalkyl, tert-aminoalkyl, or aryl group when $x$ has a value of one or, when $x$ has a value of two, an alkylene or phenylene group. Usually $R^o$ will not have over 17 carbon atoms, but the reaction is not limited to the resulting nitriles since it can be applied to nitriles of carboxylic acids having over 18 carbon atoms.

Amines which may be used include alkylamines, hydroxyalkylamines, cycloalkylamines, aralkylamines, tert-aminoalkylamines, and ether amines. Examples of these are methylamine, ethylamine, propylamine, isopropylamine, isobutylamine, n-butylamine, sec-butylamine, amylamine, hexylamine, octylamine, $\alpha$-ethylhexylamine, -octylamine, isononylamine, dodecylamine, cetylamine, hydroxyethylamine, hydroxypropylamine, hydroxybutylamine, methoxyethylamine, butoxyethylamine, ethoxyethoxyethylamine, phenoxyethylamine, phenylmercaptoethylamine, propoxypropylamine, dodecoxypropylamine, benzoxyethylamine, cyclopentylamine, cyclohexylamine, methylcyclohexylamine, benzylamine, phenylethylamine, p-methylbenzylamine, butylbenzylamine, p-chlorobenzylamine, methoxybenzylamine, dimethylaminoethylamine, dibutylaminoethylamine, dimethylaminopropylamine, diethylaminopropylamine, dibutylaminopropylamine, morpholinopropylamine, piperidinopropylamine, pyrrolidinopropylamine, N-benzyl-N-methylaminopropylamine, cyclohexylaminopropylamine, N - dodecyl-N-methylaminopropylamine, etc. In each case it will be noted the carbon attached to amine nitrogen carries a hydrogen.

The most useful amines may be summarized by the formula $RNH_2$, where R is alkyl, cycloalkyl, aralkyl, hydroxyalkyl, alkoxyalkyl, or tert-aminoalkyl. Usually R will not contain over 18 carbon atoms. The group R may also be an alkylene group in a diamine, preferably when the reaction is with a mononitrile to give diamides. With diamides and dinitriles resins can result.

It has been found that a few secondary amines react with selected nitriles and water under the influence of hydrogen sulfide as catalyst, but this reaction is not general. In some cases N,N-disubstituted amides can be isolated while in other cases unsubstituted amides or other substances result, depending upon the particular reactants and the temperature.

Typical procedures for preparing N-substituted amides are given in the following illustrative examples, wherein parts are by weight.

*Example 1*

Into 73 parts of butylamine was passed $H_2S$ until 4.3 parts had been absorbed. This was then combined with 20.5 parts of acetonitrile and 45 parts of water, charged to a pressure vessel, closed, and heated to 145–150°. The mixture was heated for 16 hours, giving a maximum pressure of 180 p. s. i. g. The autoclave was cooled, opened and the contents distilled to yield, after some intermediate fractions, 45.5 parts of N-n-butylacetamide, boiling at 132–139° C. at 18 mm., and analyzing correctly for nitrogen content.

*Example 2*

To a mixture of 107 parts of benzylamine and 45 parts of water was added 4.3 parts of hydrogen sulfide. The mixture was charged, along with 20.5 parts of acetonitrile, to a pressure autoclave and heated at 150° C. for 4 hours, developing a pressure of 95 p. s. i. g. The product was rinsed out of the autoclave with 100 parts of ethanol, and distilled to remove unreacted amine and water. The residue solidified, and was recrystallized by solution in hot ether, addition of octane until turbidity was obtained and chilling in an ice bath. In this way, after several crystallizations, there was obtained 48.3 parts of N-benzylacetamide melting at 62–63° C.

Example 3

In the same way there were mixed in the cold 51 parts of water, 31 parts of methylamine, 20.5 parts of acetonitrile, and 4.5 parts of hydrogen sulfide. This mixture was heated in an autoclave for eight hours at 100° C. under pressure. The product was distilled at 112–3° C./24 mm., amounted to 25 parts, and corresponded in composition to N-methylacetamide. The nitrogen content found by analysis was 19.1% (theory 19.2%). The product had a refractive index, $n_D^{25}$, of 1.4311.

Example 4

The same general procedure was followed with 50 parts of water, 4.9 parts of hydrogen sulfide, 19.3 parts of ammonia, and 23.6 parts of acetonitrile. Reaction was carried on for nine hours at 100° C. There was obtained a solid, melting at 77°–81° C., in an amount of 24 parts corresponding in composition to acetamide.

Example 5

In a similar way there were reacted 20.5 parts of acetonitrile, 45 parts of water, and 73 parts of n-butylamine in the presence of 4.3 parts of hydrogen sulfide. Reaction was performed at 85° C. for nine hours. The product was obtained as a fraction distilling at 131°–134° C./18 mm. in an amount of 13.5 parts. It was identified as N-butylacetamide, $CH_3CONHC_4H_9$.

Example 6

In the same general way there were mixed and reacted 63 parts of water, 28.5 parts of acetonitrile, and 102.3 parts of n-butylamine in the presence of 5.9 parts of hydrogen sulfide. Reaction was effected at 150° C. for four hours. The product was obtained as a fraction distilling at 130°–5° C./18 mm. in an amount of 74 parts. It contained 12.2% of nitrogen and had a refractive index, $n_D^{25}$, of 1.4392, corresponding to N-butylacetamide, for which the theoretical nitrogen content is 12.2%.

Example 7

By the same general procedure there were mixed and reacted 23 parts of water, 10.3 parts of acetonitrile, and 92.5 parts of phenethylamine in the presence of 2.1 parts of hydrogen sulfide. Reaction was effected at 100° C. for eight hours to give 28.8 parts of a solid which melted at 43–46° C. By analysis this product contained 8.71% of nitrogen and was β-phenethylacetamide, for which the theoretical nitrogen content is 8.6%.

Example 8

In this preparation the reaction mixture was composed of 45 parts of water, 20.5 parts of acetonitrile, 107 parts of benzylamine, and 4.3 parts of hydrogen sulfide. The reaction was effected at 150° C. for four hours. The product was a solid melting at 62–3° C. in an amount of 48.3 parts. It was N-benzylacetamide. The nitrogen content found was 9.42% (theory 9.40%).

Example 9

A mixture of 45 parts of water, 20.5 parts of acetonitrile, 99 parts of cyclohexylamine, and 4.3 parts of hydrogen sulfide was heated at 150° C. for eight hours. The product, N-cyclohexylacetamide, amounted to 50.6 parts and melted at 105–6° C. Nitrogen content of the product was found to be 9.90% (theory 9.93%).

Example 10

In this preparation a mixture of 45 parts of water, 20.5 parts of acetonitrile, 61 parts of ethanolamine, and 4.3 parts of hydrogen sulfide was heated under pressure, as usual, at 150° C. for eight hours. The product, N-hydroxyethylacetamide, was obtained in an amount of 18.4 parts, distilling at 155–160° C./3 mm. It had a refractive index at 25° C. of 1.4735. The product contained 13.5% of nitrogen by analysis (theory 13.6%).

In the same way other hydroxyalkylamines can be reacted to give the corresponding N-hydroxyalkylacetamides.

Example 11

A mixture comprising 45 parts of water, 20.5 parts of acetonitrile, 93 parts of aniline, and 3.9 parts of hydrogen sulfide was heated at 150° C. for eight hours. The product, N-phenylacetamide, was obtained as a solid, melting at 110°–112° C. in an amount of 10.5 parts. No depression in melting point resulted when this compound was mixed with an authentic sample of N-phenylacetamide. The nitrogen content found for the product was 10.6% (theory 10.4%).

Example 12

By the same general procedure there were reacted 47 parts of water, 34.5 parts of n-butyronitrile, and 31 parts of methylamine in the presence of 4.3 parts of hydrogen sulfide. The temperature of reaction was 100° C. and the period of heating was eight hours. The product was n-methylbutyramide, in an amount of 36.8 parts, distilling at 120°–123° C./22 mm. It had a refractive index at 25° C. of 1.4389 and contained by analysis 14.0% of nitrogen (theory 13.9%).

Example 13

In the same general way a mixture of 28 parts of water, 71.2 parts of palmitonitrile, 18.7 parts of methylamine, and 2.9 parts of hydrogen sulfide was heated at 160° C. for eight hours. The product, amounting to 52.7 parts, was a solid melting at 81°–82° C. It was N-methylpalmitamide. The nitrogen content of the material obtained was 5.19% (theory 5.21%).

Example 14

A mixture of 47 parts of water, 51.5 parts of benzonitrile, 31 parts of methylamine, and 4.3 parts of hydrogen sulfide was heated in an autoclave at 150° C. for eight hours. The product, N-methylbenzamide amounted to 42.3 parts. It was a solid melting at 79°–82° C. The nitrogen content of the product obtained was 10.5% (theory 10.4%).

Example 15

Hydrogen sulfide is passed into a mixture of 60 parts of 3-(dimethylamino)propylamine and 60 parts of water until 3 parts are absorbed. To this solution is added 62.7 parts of myristonitrile and the mixture charged to an autoclave. After heating at 145–160° C. for 8 hours, the mixture is cooled and the autoclave opened. On distillation of the contents, there is obtained first a water fraction, then some recovered dimethylaminopropylamine, and finally from the residue about 50 parts of N-3-(dimethylamino)-propylmyristamide

at about 200° C. at 1 mm. A neutral equivalent of this material by titration with 0.1 N hydrochloric acid gives a molecular weight of 320 (theory 312).

Stearonitrile, 75 parts, and 50 parts of 2-(dimethylamino)ethylamine reacted in the same manner with 3 parts of hydrogen sulfide and 60 parts of water, gives an oil boiling at about 210° C. at 1 mm., neutral equivalent, 355. This is N-2-(dimethylamino)ethylstearamide.

Example 16

To 125 parts of N-2-(4-morpholino)ethylamine and 50 parts of water is added 4 parts of hydrogen sulfide. To this is added 21 parts of acetonitrile and the whole mixture is autoclaved for 8 hours at 140–150° C. The mixture is then stripped of water and most of the starting amine by heating under water vacuum to 100° C. The partially crystalline residue is obtained pure from a mixture of ethanol and ethyl acetate. It melts at 93–95° C. This product has the structure

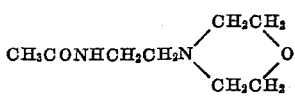

In the same way from 90 parts of lauronitrile, 140 parts of N-2-(4-morpholino)ethylamine, 50 parts of water, and 4 parts of hydrogen sulfide is obtained on distillation an oil boiling at about 220° C. at 1 mm. which on cooling solidifies, and may be crystallized from ethanol to yield a solid melting at 65–68° C. This solid has a neutral equivalent by titration with 0.1 N HCl of 360. It is N-2-morpholinoethyllauramide.

Example 17

A mixture is made of 92.5 parts of n-dodecylamine and 22.5 parts of water. Hydrogen sulfide gas is introduced to a total of 2.1 parts, 10.3 parts of acetonitrile is added. The mixture is heated in a stirred autoclave at 100° C. for eight hours. On cooling it is transferred to a distilling flask. After foreruns, there is recovered 56 parts of n-dodecylamine, boiling at 142–176° C. at 32 mm., a mixed fraction amounting to 12 parts distilling at 176 to 224° C., and finally N-dodecylacetamide, distilling at 224–229° C./17 mm. to a total of 28.8 parts. This material crystallizes and melts at 53–55° C. Further recrystallization from ethyl acetate gives the product as a white, waxy solid melting at 58–59° C. Percentage of nitrogen found was 6.18 (theory 6.17). No sulfur was present. This solid is N-dodecylacetamide.

Example 18

Into 96 parts of a 42% methylamine solution is led 10 parts of hydrogen sulfide. The solution is combined with 83 parts of ethylene cyanohydrin and heated for 5 hours at 150° C. On distillation there is obtained 66 parts of a yellow oil distilling at 169–172° C./13 mm. A redistilled sample gave 13% nitrogen by the Kjeldahl method (calculated 13.6). It contained about 1% sulfur.

Example 19

To a mixture of 73 parts of n-butylamine and 45 parts of water is added 4.3 parts of hydrogen sulfide with cooling. This is placed in an autoclave with 35 parts of n-butyronitrile and heated at 148° C. for four hours. The bomb is cooled and opened and the contents distilled. There is obtained 53 parts of N-n-butyl-n-butyramide distilling at 136–139° C./12 mm. containing 9.9% nitrogen (theory 9.8%), and having a refractive index, $n_D^{25}$, of 1.4419.

Example 20

A mixture of 30 parts of ethanolamine and 20 parts of water is treated with 2.5 parts of hydrogen sulfide and 42 parts of β-methoxypropionitrile is added. The mixture is heated for 12 hours at about 150° C. in an autoclave. On distillation there is obtained N-hydroxyethyl-β-methoxypropionamide, distilling at 140–145° C./1–2 mm.

Many amides have been previously known; some which have been prepared by reacting amine, water, and nitrile in the presence of hydrogen sulfide as catalyst are new. The amides in general are useful chemical intermediates. Some are useful as solvents; some are useful as softeners and plasticizers for resins, as insecticides, as water-repellents, and textile softening and finishing agents. The presence of long chains and/or ether substituents renders these compounds particularly useful for the latter purposes. Amides having amino substituents are useful in treating paper and textiles. The tertiary amino groups can be alkylated to yield amido quaternary ammoniated compounds.

We claim:
1. A process for preparing carboxylic amides which comprises reacting together in a homogeneous system, a nitrile, water, and a primary amine, in which the carbon attached to nitrogen carries a hydrogen atom, in the presence of hydrogen sulfide as catalyst in an amount of 1 to 50 mole percent of the nitrile at a reacting temperature between about 85° C. and 175° C. at a pressure sufficient to maintain the liquid phase.

2. A process for preparing carboxylic amides which comprises reacting together in a homogeneous system, water, a primary amine, $RNH_2$, in which the carbon attached to nitrogen carries a hydrogen atom and R represents a member of the class consisting of alkyl, cycloalkyl, aralkyl, hydroxyalkyl, alkoxyalkyl, and tert-aminoalkyl groups, and a nitrile $R^o(CN)_x$, wherein $x$ has a value of one to two and $R^o$ is a member of the class consisting of alkyl, cycloalkyl, hydroxyalkyl, alkoxyalkyl, tert-aminoalkyl, and aryl groups when $x$ has a value of one and alkylene and phenylene groups when $x$ has a value of two, the reaction being effected in the presence of hydrogen sulfide as catalyst in an amount of 1 to 50 mole percent of the nitrile and at a reacting temperature between 85° and 175° C. at a pressure sufficient to maintain the liquid phase.

3. A process for preparing N-methylacetamide which comprises reacting together at a pressure sufficient to maintain the liquid phase, in a homogeneous system, in the presence of hydrogen sulfide as catalyst, and at a reacting temperature between 85° and 175° C. water, methylamine, and acetonitrile, the hydrogen sulfide being 1 to 50 mole percent of the acetonitrile.

4. A process for preparing N-benzylacetamide which comprises reacting together at a pressure sufficient to maintain the liquid phase, in a homogeneous system, in the presence of hydrogen sulfide as catalyst, and at a reacting temperature between 85° and 175° C. water, benzylamine, and acetonitrile, the hydrogen sulfide being 1 to 50 mole percent of the acetonitrile.

5. A process for preparing N-3-(dimethylamino)propylmyristamide which comprises reacting together at a pressure sufficient to maintain the liquid phase, in a homogeneous system, in the presence of hydrogen sulfide as catalyst, and at a reacting temperature between 85° and 175° C. 3-(dimethylamino)-propylamine, water and myristonitrile, the hydrogen sulfide being 1 to 50 mole percent of the myristonitrile.

6. A process for preparing N-β-hydroxyethylacetamide which comprises reacting together at a pressure sufficient to maintain the liquid phase, in a homogeneous system, in the presence of hydrogen sulfide as catalyst, and at a reacting temperature between 85° and 175° C. β-hydroxyethylamine, water, and acetonitrile, the hydrogen sulfide being 1 to 50 mole percent of the acetonitrile.

7. A process for preparing N-β-hydroxyethyl-β-methoxypropionamide which comprises reacting together at a pressure sufficient to maintain the liquid phase, in a homogeneous system, in the presence of hydrogen sulfide as catalyst, and at a reacting temperature between 85° and 175° C. β-hydroxyethylamine, water, and β-methoxypropionitrile, the hydrogen sulfide being 1 to 50 mole percent of the β-methoxypropionitrile.

References Cited in the file of this patent

UNITED STATES PATENTS

| | | |
|---|---|---|
| 2,357,484 | Martin | Sept. 5, 1944 |
| 2,476,500 | Mahan | July 19, 1949 |

OTHER REFERENCES

Galat et al.: J. A. C. S., vol. 65, August 1943, pages 1566–67.

Wagner et al.: Synthetic Organic Chemistry, 1953, No. 354, page 570.